2
United States Patent [19]

Braunling

[11] Patent Number: 4,661,939
[45] Date of Patent: Apr. 28, 1987

[54] LIGHT VEHICLE RANGE DISCRIMINATOR

[75] Inventor: Russell D. Braunling, Hennepin, Minn.

[73] Assignee: Honeywell Inc., Minneapolis, Minn.

[21] Appl. No.: 772,101

[22] Filed: Sep. 3, 1985

[51] Int. Cl.⁴ .............................................. G08B 13/00
[52] U.S. Cl. .................................... 367/136; 340/566
[58] Field of Search ................ 367/133, 136; 102/215; 340/566

[56] References Cited

U.S. PATENT DOCUMENTS

| | | | |
|---|---|---|---|
| 3,585,581 | 6/1971 | Aune et al. | 367/136 |
| 3,745,552 | 7/1973 | Wilt | 367/136 X |
| 3,780,653 | 12/1973 | Stinchcomb | 367/136 X |
| 4,158,832 | 6/1979 | Barnes, Jr. et al. | 340/566 X |
| 4,468,763 | 8/1984 | Braunling et al. | 367/136 |

Primary Examiner—Richard A. Farley
Attorney, Agent, or Firm—Roger W. Jensen

[57] ABSTRACT

In combination, intrusion detection apparatus giving a signal when a light vehicle approaches a geophone, and a heavy vehicle discriminator disabling the detection apparatus when the approaching vehicle is a heavy one.

5 Claims, 2 Drawing Figures

LIGHT VEHICLE RANGE DISCRIMINATOR

The Government has rights in this invention pursuant to Contract F0865-79-C-0178, awarded by the Department of the Air Force.

TECHNICAL FIELD

This invention relates to the field of armaments, and particularly to geophone apparatus for use with land mines.

BACKGROUND OF THE INVENTION

Occasion sometimes arises to interdict the movement of vehicles in an outdoor area. This may be done by distributing mines, throughout the area, which function upon firing to disable a vehicle within an effective range from the mine. Mines are accordingly equipped with geophone apparatus for detecting the approach of targets within the range thereof.

It is desirable that such mines be not readily perceptible, and thus avoidable, by approaching vehicles: passive vehicle detecting arrangements are accordingly preferred. In this respect, seismic devices such as geophones, supported on or buried in the ground and responsive to vibrations in the earth caused by the vehicles, have been found quite satisfactory, as is taught in U.S. Pat. No. 4,468,763. A difficulty arises, however, since in such arrangements the seismic signal due to a light wheeled vehicle near to the geophone is not readily distinguishable from the seismic signal due to a heavy tracked vehicle more remote from the geophone. Some land mines are also known to be effective against light vehicles, such as jeeps, but to be relatively ineffective against heavier vehicles, such as armored tanks. It is inefficient to cause a mine to fire when its target is too remote for the mine to be effective, or when the target is one against which the mine is ineffective, since mines are expensive, high-technology devices.

Apparatus has been developed for receiving seismic vibrations from an approaching vehicle, distinguishing whether the seismic source is a heavy vehicle or a light vehicle, and giving a control signal if the source is a heavy vehicle. One arrangement for accomplishing this is taught in my co-pending patent application Ser. No. 753,733, filed July 10, 1985 and assigned to the assignee of the present application.

SUMMARY OF THE INVENTION

The present invention comprises seismically responsive means for detecting the presence of approaching vehicles, means distinguishing seismic signals due to heavy vehicles, means giving a control signal when a light vehicle is within a predetermined range, and means inhibiting the control signal if the seismic signal source is determined to be a heavy vehicle.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
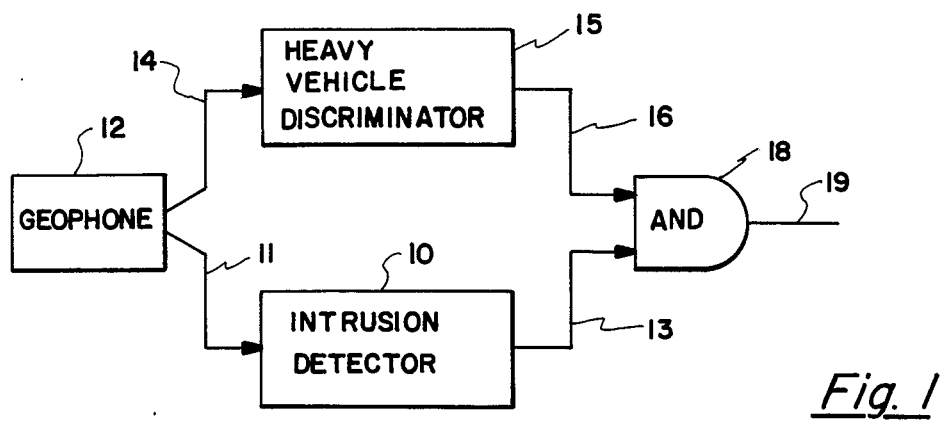
FIG. 1 is a block diagram of the combination of elements making up the invention.

Referring first to FIG. 1, an intrusion detecting device 10 is connected at 11 to a geophone 12, and gives an output 13 when an intruding vehicle is detected by the geophone. Also connected to geophone 12, at 14, is a heavy vehicle discriminator 15, which gives output 16 when a heavy vehicle is detected. Outputs 13 and 16 are connected to a logical AND 18 so that a control signal is supplied at 19 when a light vehicle at proper range is detected, but is inhibited if the seismic source is a heavy vehicle. Signal 19 may be used to control the firing of a mine with which the geophone is associated, or for any other desired purpose.

Figure 2:
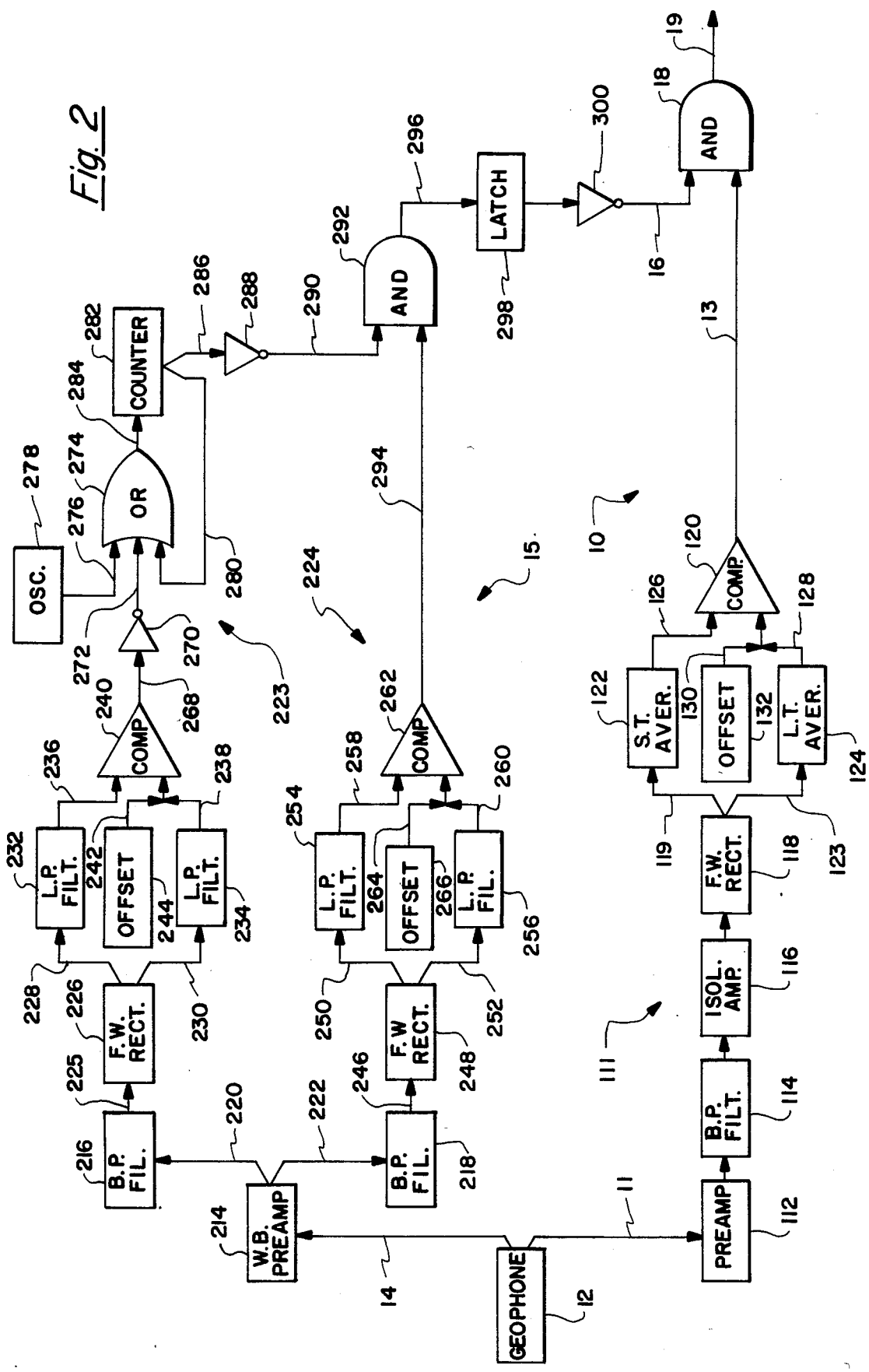
FIG. 2 is a more detailed showing of the apparatus of FIG. 1.

Turning now to FIG. 2, one form of an intrusion detector 10 is shown to comprise a low frequency channel 111 including a preamplifier 112 connected to 11 to geophone 12 and supplying a signal through a bandpass filter 114 having a pass band of about 1.5 to 8.5 Hertz, an isolation amplifier 116, and a full wave rectifier 118 as an input 119 to a short-term averager 122 having a time constant of about 4 seconds and an input 123 to a long-term averager 124, having a time constant of about 12 seconds. The averager outputs 126 and 128 respectively are supplied to a comparator 120, together with the output 130 of an offset device 132, and comparator 120 gives signal 13 when a vehicle is within a predetermined range of the geophone.

FIG. 2 also shows that in discriminator 15 geophone signal 14 is supplied to a wide band preamplifier 214, which energizes bandpass filters 216 and 218 with signals 220 and 222. Filter 216 is a part of a high frequency channel 223, and preferably has a pass band of about 20 Hertz to 150 Hertz. Filter 218 is part off a low frequency channel 224, and preferably has a pass band of about 1.5 Hertz to 8.5 Hertz. Channel 224 has a considerably higher gain than channel 111 of detector 10.

The output 225 from filter 216 is fed to a full wave rectifier 226 which supplies inputs 228 and 230 respectively to a first low pass filter 232, acting as a short-term averager, and a second low pass filter 234, acting as a long-term averager. Filter 232 preferably has a time constant of about 8 seconds, and filter 234 preferably has a time constant of about 16 seconds. The outputs 236 and 238 respectively of filter 232 and 234 are supplied to a comparator 240, together with the output 242 of an offset device 244.

The output 246 from filter 218 is fed to a full wave rectifier 248 which supplies inputs 250 and 252 respectively to a first low pass filter 254, acting as a short-term averager, and a second low pass filter 256, acting as a long-term averager. Filter 254 preferably has a time constant of about 4 seconds, and filter 256 preferably has a time constant of about 12 seconds. The outputs 258 and 260 respectively of filters 254 and 256 are supplied to a comparator 262, together with the output 264 of an offset device 266.

The output 268 of comparator 240 is fed through an inverter 270 to comprise a first input 272 to an OR circuit 274, having a second input 276 from an oscillator 278 and a feedback input 280 comprising the output of a counter 282 energized at 284 from OR circuit 274.

The output of counter 282 is also supplied at 286 to an inverter 288 which supplies a first input 290 to an AND circuit 292. A second input 294 to AND circuit 292 is supplied by comparator 262, and the output 296 of AND 292 is supplied through a latch 298 and an inverter 300 to constitute input 16 to AND circuit 18.

In computer terminology the outputs of counter 282, AND circuit 292, latch 298, and comparators 120, 240, and 262 are normally LOW, and those of inverters 288 and 300, OR circuit 274, and inverter 270 are HIGH.

OPERATION

A moving heavy vehicle acts as a source of seismic vibrations of two types, identified respectively as Rayleigh waves and pressure waves. The Rayleigh waves occur in a high frequency band and a low frequency band, while the pressure waves occur only in a low frequency band, which is the same however as that of the low frequency Rayleigh waves. Pressure waves are more subject to attenuation than are Rayleigh waves, so that for an approaching heavy vehicle the Rayleigh waves are detected the sooner.

A moving light vehicle acts as a source of seismic vibrations of the same types, except that there is no significant low frequency band of Rayleigh waves. The amplitudes of the light vehicle signals are also smaller, so that they are detected after a greater delay than the heavy vehicle signals.

When a geophone is coupled to the ground, there is always a seismic signal at a background level. When this is rectified and sent to averaging circuits such as 122 and 124, the outputs of these circuits continue generally at constant levels. By suitably selecting the components of offset apparatus such as 132, the inputs to a comparator such as 120 may be so set that in the absence of any signal from an approaching vehicle, the long-term average 128 with offset 130 is always greater than the short-term average 126, so that comparator 120 produces no output 13.

In the same manner, offset devices 244 and 266 can be set so that in the absence of any signal from an approaching vehicle, long-term averages 238 and 260 with offsets 242 and 264 are always greater than short-term averages 236 and 258, and comparators 240 and 262 provide no outputs.

When any vehicle approaches a geophone, the seismic signals in general increase as the vehicle moves closer. If a light vehicle approaches the geophone, the initial low frequency seismic signal consists of pressure waves. If a heavy vehicle approaches the geophone, the initial low frequency seismic signal consists of Rayleigh waves. Because of lesser soil attenuation, low frequency Rayleigh waves travel much further than low frequency pressure waves.

The low frequency seismic component to channel 111, whether Rayleigh or pressure waves, causes the signal produced by rectifier 118 to increase, so that outputs 126 and 128 both increase. However, because of the difference in time constants in circuits 122 and 124, the output of the former can increase more rapidly than the output of the latter until the relation of the signals to comparator 120 reverses, and the comparator now gives an output 13.

The distance, from the geophone to the vehicle, at which output 13 is given may be adjusted by offset device 132, which is set so that the distance is small enough for a light vehicle approaching the mine to be incapacitated. If the approaching vehicle is a heavy one, the initial seismic input contains low Rayleigh waves, and because of their lesser attenuation, the output 13 from comparator 120 occurs at an earlier time, when the heavy vehicle is far from the geophone which renders ineffective mine operation. To prevent this, output 13 is supplied to the mine through AND circuit 18, which does not give its output 19 in response thereto unless discriminator signal 16 is also present, identifying the approaching vehicle as a light one, as will now be described.

If the approaching vehicle is a heavy one, the low frequency Rayleigh waves act in channel 224 to cause comparator 262 to go HIGH at a time $t_1$, and the high frequency Rayleigh waves act in channel 223 to cause comparator 240 to go HIGH at a time $t_2$. It has been determined that, for heavy vehicles, time $t_1$ may occur before or after time $t_2$, but that time $t_1$ always occurs before a time $t_3$ which is later than $t_2$ by about 4.3 seconds.

If $t_1$ precedes $t_2$, the output 294 of comparator 262 can pass through AND 292 to comprise a HIGH output at 296, which passes through and is held in latch 298, disabling AND 18 through inverter 300.

If $t_2$ precedes $t_1$, the output of comparator 240 goes HIGH, that of inverter 270 goes LOW, and pulses from oscillator 278 may now pass through OR 274 to counter 282. After a predetermined count is reached, corresponding to 4.3 seconds, counter outputs 280 and 286 go HIGH, the former interrupting further counting and the latter acting through inverter 288 to disable AND 292, and thus prevent any later operation of comparator 262 from affecting latch 298.

An approaching light vehicle will not act through discriminator 15 to disable AND 18 because for light vehicles comparator 262 does not give its output 294 until after the 4.3 second delay in counter 282 has disabled AND 292.

From the above it will be evident that channels 223 and 224 cooperate to supply signals which actuate latch 298 at a value which disables AND 18 if an approaching vehicle is a heavy one. Channel 111 supplies a signal at 13 to AND 18 whether the vehicle is heavy or light.

Since channels 224 and 111 have much the same characteristics, it is desired that channel 224 operate sooner than channel 111, which can be accomplished by giving it a higher gain.

From the above it will be evident that the invention comprises intrusion detetion apparatus for giving a signal when a light vehicle approaches a geophone, together with apparatus for disabling the detection apparatus when the approaching vehicle is a heavy one.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. Apparatus for detecting and signaling the intrusion (with respect to a point on the earth) of a light vehicle including means to prevent a signaling of a heavy vehicle intruding upon said point, said apparatus comprising in combination:

(a) single geophone means mounted and adapted to respond to vibrations in the ground and to provide an output indicative of vibrations sensed thereby;

(b) first means including high-pass means connected to receive the output of said geophone means, said first means further including means for providing an output when the long-term average of high frequency vibrations reaches a predetermined relation to the short-term average thereof;

(c) second means including low pass means connected to receive the output of said geophone means, said second means further including means for providing an output when the long-term average of low-frequency vibrations reaches a pedetermined relation to the short-term average thereof;

(d) an oscillator means having an output for providing pulses;

(e) OR circuit means having three inputs and an output means;

(f) counter means having an input and an output;

(g) first AND circuit means having a pair of inputs and an output;

(h) latch means having an input and an output;

(i) means including inverter means for connecting the output of said first means to one of said inputs of said OR circuit means, said other inputs of said OR circuit means being connected to receive: (1) the output of said oscillator means, and (2) an output from said counter means, and said OR circuit output means being connected to the input of said counter means;

(j) means including inverter means for connecting the output of said counter means to one of the input means of said first AND circuit means;

(k) means connecting the output of said second means to the other of the input means of said first AND circuit means;

(l) means connecting the output of said first AND circuit means to the input of said latch means;

(m) second AND circuit means having a pair of inputs and an output;

(n) means including inverter means connecting the output of said latch means to one of the inputs of said second AND circuit means;

(o) third means including low pass means connected to receive the output of said geophone means, said third means further including means for providing an output when the long-term average of low-frequency vibrations reaches a predetermined relation to the short-term average thereof; and (p) means connecting the output of said third means to the other input of said second AND circuit means whereby said apparatus functions as follows:

(1) upon the approach of a heavy vehicle toward said point said first and second means signals are connected as aforesaid to thereby cause said latch means to operate to thereby signal the intrusion of a heavy vehicle, the operation of said latch means in turn inhibiting said second AND gate from signal in a vehicle at the output thereof, (2) upon the approach of a light vehicle toward said point, said first and second means function coactively so as to inhibit the operation of said latch means, and said third means functions to produce an output signal which is applied to said other input of said second AND circuit means to thereby produce a signal at the output thereof indicative of the presence of a light vehicle.

2. Apparatus of claim 1 further characterized by the output of said second means occurring prior to the production of an output by said third means.

3. Apparatus of claim 2 further characterized by said first means having a band pass of between 20 and 150 Hertz.

4. Apparatus of claim 2 further characterized by said second and third means having a band pass of between 1.5 and 8.4 Hertz.

5. Apparatus of claims 1 or 2 characterized by said first means having a band pass of between 20 and 150 Hertz and said second and third means having a band pass of between 1.5 and 8.5 Hertz.

* * * * *